United States Patent
Okamura et al.

(10) Patent No.: US 8,392,090 B2
(45) Date of Patent: Mar. 5, 2013

(54) VEHICLE DRIVING FORCE CONTROL APPARATUS

(75) Inventors: Yukari Okamura, Gotenba (JP); Koji Taguchi, Isehara (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 367 days.

(21) Appl. No.: 12/669,387

(22) PCT Filed: Jul. 25, 2008

(86) PCT No.: PCT/JP2008/063375
§ 371 (c)(1),
(2), (4) Date: Jan. 15, 2010

(87) PCT Pub. No.: WO2009/017044
PCT Pub. Date: Feb. 5, 2009

(65) Prior Publication Data
US 2010/0191435 A1    Jul. 29, 2010

(30) Foreign Application Priority Data
Jul. 27, 2007    (JP) ................................. 2007-196618

(51) Int. Cl.
*B60T 8/32* (2006.01)
(52) U.S. Cl. ................. 701/93; 701/54; 701/55; 701/84; 701/87; 701/90
(58) Field of Classification Search .................... 701/93, 701/84, 87, 90, 54, 55
See application file for complete search history.

(56) References Cited

U.S. PATENT DOCUMENTS

| | | | | |
|---|---|---|---|---|
| 5,799,262 A | * | 8/1998 | Suzuki | 701/93 |
| 5,957,992 A | * | 9/1999 | Kiyono | 701/93 |
| 6,370,470 B1 | * | 4/2002 | Yamamura et al. | 701/96 |
| 7,599,780 B2 | * | 10/2009 | Whitney et al. | 701/102 |

(Continued)

FOREIGN PATENT DOCUMENTS

| | | |
|---|---|---|
| DE | 100 65 368 A1 | 9/2001 |
| DE | 101 56 948 A1 | 6/2003 |

(Continued)

OTHER PUBLICATIONS

German Office Action issued Nov. 21, 2011 in patent application No. 11 2008 002 012 4 (with English Translation).

*Primary Examiner* — James Trammell
*Assistant Examiner* — Truc M Do
(74) *Attorney, Agent, or Firm* — Oblon, Spivak, McClelland, Maier & Neustadt, L.L.P.

(57) ABSTRACT

A hybrid electronic control unit sets a target vehicle speed for constant-speed driving based on setting operation of an auto cruise switch by a driver. When the target vehicle speed is set, the required torque is set such that the vehicle speed detected by a vehicle speed sensor becomes the target vehicle speed. When the required torque is set, a constant-speed driving torque map, indicating the required torque with respect to a torque command value by accelerator operation or brake operation by the driver using the required torque, and a positive maximum torque and a negative maximum torque, which the vehicle can output, is set. Further, the required torque changes using the constant-speed driving torque map according to the torque command value. In the hybrid electronic control unit, by increasing followability of torque change when changing the vehicle speed from the constant-speed driving, controllability is improved and drivability is improved.

6 Claims, 4 Drawing Sheets

U.S. PATENT DOCUMENTS

| | | | |
|---|---|---|---|
| 2001/0016538 A1* | 8/2001 | Saito et al. | 477/111 |
| 2001/0027370 A1* | 10/2001 | Tamura et al. | 701/93 |
| 2003/0120412 A1 | 6/2003 | Mayer | |
| 2003/0236624 A1* | 12/2003 | Kimura et al. | 701/301 |
| 2005/0003926 A1* | 1/2005 | Hanada et al. | 477/3 |
| 2005/0010335 A1* | 1/2005 | Kettenacker et al. | 701/1 |
| 2006/0175103 A1* | 8/2006 | Iida et al. | 180/65.4 |
| 2007/0255477 A1* | 11/2007 | Okuda et al. | 701/93 |
| 2009/0150038 A1* | 6/2009 | Woods | 701/93 |

FOREIGN PATENT DOCUMENTS

| | | |
|---|---|---|
| JP | 1 95946 | 4/1989 |
| JP | 7 47862 | 2/1995 |
| JP | 8 282328 | 10/1996 |
| JP | 10 309959 | 11/1998 |
| JP | 2000 43611 | 2/2000 |
| JP | 2004 76724 | 3/2004 |
| JP | 2005 329944 | 12/2005 |

* cited by examiner

VEHICLE DRIVING FORCE CONTROL APPARATUS

TECHNICAL FIELD

The present invention relates to a vehicle driving force control apparatus, and especially relates to a hybrid vehicle driving force control apparatus capable of driving with an engine and an electric motor as a power source.

BACKGROUND ART

Recently, a hybrid vehicle equipped with an engine for outputting torque by burning of fuel and an electric motor for outputting the torque by supply of electricity and capable of driving by transmitting the torque of the engine and the electric motor to wheels is suggested. In such a hybrid vehicle, the wheels are driven only by the torque of the electric motor or driven by the torque of both the engine and the electric motor, by controlling driving and stopping of the engine and the electric motor according to driving condition, and the electric motor can be driven by electricity stored in a battery and when the energy of the battery decreases, the battery is charged by driving the engine.

That is to say, the hybrid vehicle is provided with the engine and the electric motor as a drive power source and with a planetary gear for combining the power of the engine and the electric motor to transmit to the wheels. Specifically, it is configured such that an output shaft of the engine is coupled to a carrier of the planetary gear and an output shaft of the electric motor is coupled to a ring gear of the planetary gear, and the power is transmitted from a sprocket coupled to the ring gear to the wheels. Also, an electricity generator is provided between the planetary gear and the engine, and a rotating shaft of the electricity generator is coupled to a sun gear of the planetary gear. Therefore, the power of the engine is divided to the wheels and the electricity generator by the planetary gear, and by controlling a rotation speed of the electricity generator, the rotation speed of the engine can be controlled. That is to say, a power dividing mechanism composed of the planetary gear has a function of converting the rotation speed of the engine and a function of dividing the power of the engine to the wheels and the electricity generator.

In the hybrid vehicle, when a driver operates an auto cruise switch to perform constant-speed driving, the drive of the engine and the electric motor is controlled such that the target vehicle speed for performing the constant-speed driving is set and deviation between the current vehicle speed and the target vehicle speed is reduced. That is to say, the vehicle is stably driven at the target vehicle speed by calculating energy in a direction to negate the deviation between the current vehicle speed and the target vehicle speed to increase and decrease the torque of the engine and increase and decrease the torque of the electric motor.

Meanwhile, such a vehicle driving control apparatus is disclosed in Patent Documents 1 to 5.

Patent Document 1: Japanese Patent Application Laid-Open No. H07-047862
Patent Document 2: Japanese Patent Application Laid-Open No. H10-309959
Patent Document 3: Japanese Patent Application Laid-Open No. H08-282328
Patent Document 4: U.S. Patent Application Publication No. 2007/255477 Specification
Patent Document 5: Japanese Patent Application Laid-Open No. 2000-43611

DISCLOSURE OF INVENTION

Problem to be Solved by the Invention

In the above-described conventional vehicle driving control apparatus, while the vehicle is driving, when the driver operates the auto cruise switch to start the constant-speed driving, a controller controls the vehicle driving force so as to maintain the current vehicle speed to allow the vehicle to drive. However, during the constant-speed driving of the vehicle, when the driver intends to increase the vehicle speed by depressing an accelerator pedal or to decrease the vehicle speed by depressing a brake pedal, the vehicle speed does not change appropriately according to a depression amount of the accelerator pedal and the brake pedal, so that controllability deteriorates and the driver feels discomfort.

FIG. 4 is a constant-speed driving control map used for the conventional vehicle driving force control apparatus. As shown in FIG. 4, the conventional control apparatus has the constant-speed driving control map indicating required torque with respect to accelerator opening. That is to say, in a case that the driver depresses the accelerator pedal and the accelerator opening is at Acc1, when the driver operates the auto cruise switch, the control apparatus sets required torque Tr1 at the time the accelerator opening is Acc1 in order to maintain the current vehicle speed, and controls the vehicle according to the required torque Tr1, thereby the vehicle drives at the current vehicle speed even if the driver does not depress the accelerator pedal.

However, during the constant-speed driving, when the driver tries to increase the vehicle speed by depressing the accelerator pedal, even though the accelerator opening increases, the current required torque Tr1 is maintained up to the accelerator opening Acc1, and from the accelerator opening Acc1, the required torque increases according to the map, then new required torque Tr2 is set with respect to accelerator opening Acc2. Therefore, even when the driver depresses the accelerator pedal, the vehicle speed does not increase until the accelerator opening is over the accelerator opening Acc1 and continuity of the control is deteriorated, and the driver feels discomfort because the vehicle speed temporarily does not increase even though the accelerator pedal is depressed.

The present invention is for solving such a problem, and an object thereof is to provide the vehicle driving force control device for improving the controllability by increasing followability of the torque change when changing the vehicle speed from the constant-speed driving and to improve drivability.

Means for Solving Problem

In order to solve the above problem, and to attain the above object, a vehicle driving force controlling apparatus of the present invention includes vehicle speed detecting means for detecting a vehicle speed, target vehicle speed setting means for setting a target vehicle speed for constant-speed driving based on setting operation by a driver, constant-speed driving required torque setting means for setting required torque such that the vehicle speed detected by the vehicle speed detecting means becomes the target vehicle speed when the target vehicle speed is set by the target vehicle speed setting means, constant-speed driving torque map creating means for setting a constant-speed driving torque map indicating required torque with respect to a torque command value by accelerator operation or brake operation by the driver by using the required torque, and a positive maximum torque and a negative maximum torque, which the vehicle can output, when the required torque is set by the constant-speed driving required torque setting means, and required torque changing means for changing the required torque by using the constant-speed driving torque map according to the torque command value.

In the vehicle driving force controlling apparatus of the present invention, the constant-speed driving torque map creating means sets the constant-speed driving torque map indicating required driving force with respect to an accelerator operation amount by the driver by using the required torque and vehicle maximum driving force when the accelerator operation amount is the maximum.

In the vehicle driving force controlling apparatus of the present invention, the constant-speed driving torque map creating means sets the constant-speed driving torque map indicating required braking force with respect to a brake operation amount by the driver by using the required torque and vehicle maximum braking force when the brake operation amount is the maximum.

In the vehicle driving force controlling apparatus of the present invention, the constant-speed driving torque map is formed by a curved line smoothly connecting the positive maximum torque, the required torque, and the negative maximum torque, and a change amount at an early phase of change of the required torque by the required torque changing means is set so as to be smaller than the change amount at a late phase of the change.

In the vehicle driving force controlling apparatus of the present invention, when the required torque is changed by the required torque changing means, the constant-speed driving torque map creating means changes the constant-speed driving torque map by using the changed required torque, the positive maximum torque, and the negative maximum torque.

In the vehicle driving force controlling apparatus of the present invention, normal driving torque map indicating the required torque with respect to the torque command value is set in advance by using an original point, the positive maximum torque, and the negative maximum torque, and when the target vehicle speed is not set by the target vehicle speed setting means, the required torque changing means changes the required torque by using the normal driving torque map.

Effect of the Invention

According to the vehicle driving force control apparatus of the present invention, when the required torque is set by the constant-speed driving required torque setting means, since the constant-speed driving torque map indicating the required torque with respect to the torque command value is set by using the required torque, a positive maximum torque, and a negative maximum torque, and the required torque is changed by using the constant-speed driving torque map according to the torque command value, the torque command value is changed during the constant-speed driving, and the required torque is changed according to the torque command value when the vehicle changes the vehicle speed from the constant-speed driving, so that the followability of the torque change is improved to improve the controllability, and the drivability is improved.

Figure 1:
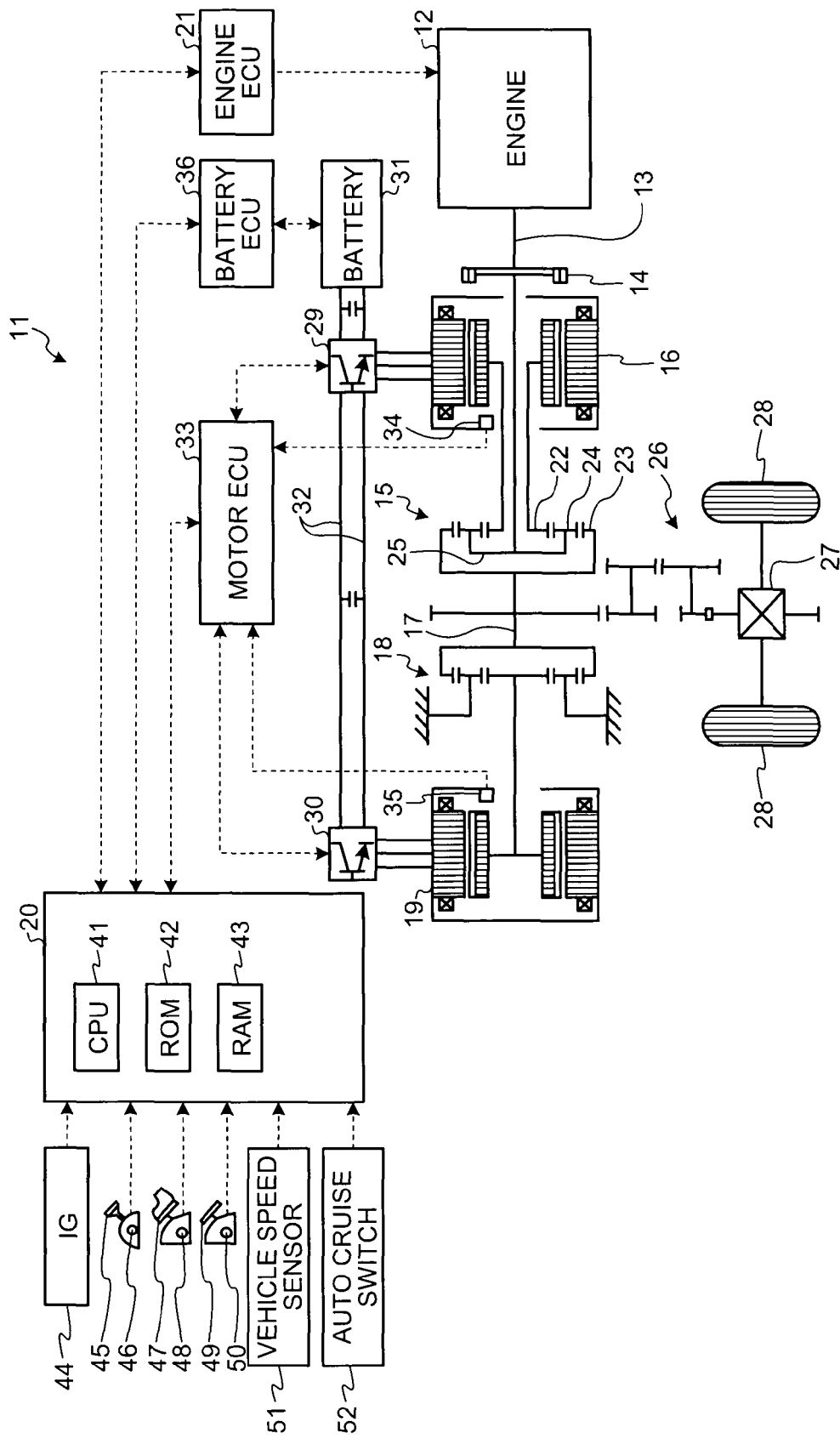
FIG. 1 is a schematic configuration diagram showing a vehicle driving force control apparatus according to one embodiment of the present invention.

EXPLANATIONS OF LETTERS OR NUMERALS 11 hybrid vehicle
12 engine
15 power distribution integration mechanism
16 motor (MG1, electric motor)
19 motor (MG2, electricity generator)
20 hybrid electronic control unit (constant-speed driving required torque setting means, constant-speed driving torque map creating means, required torque changing means)
21 engine electronic control unit, engine ECU
31 battery
33 motor electronic control unit, motor ECU
36 battery electronic control unit, battery ECU
48 accelerator pedal position sensor
50 brake pedal stroke sensor
51 vehicle speed sensor (vehicle speed detecting means)
52 auto cruise switch (target vehicle speed setting means)

BEST MODE(S) FOR CARRYING OUT THE INVENTION

Hereinafter, an embodiment of a vehicle driving force control apparatus according to the present invention is described in detail with reference to the drawings. Meanwhile, the present invention is not limited by the embodiment.

Embodiment

Figure 2:
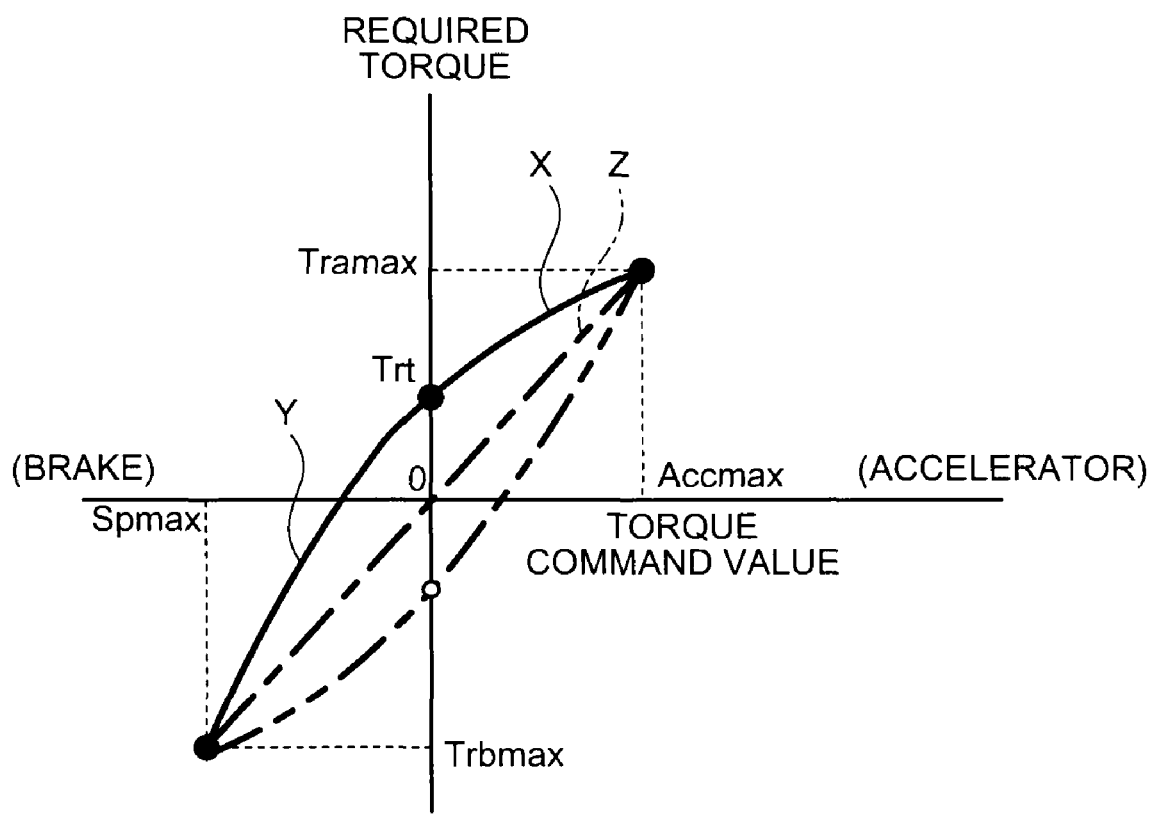
FIG. 2 is a graph showing required torque with respect to a torque command value in the vehicle driving force control apparatus of this embodiment.
Figure 3:
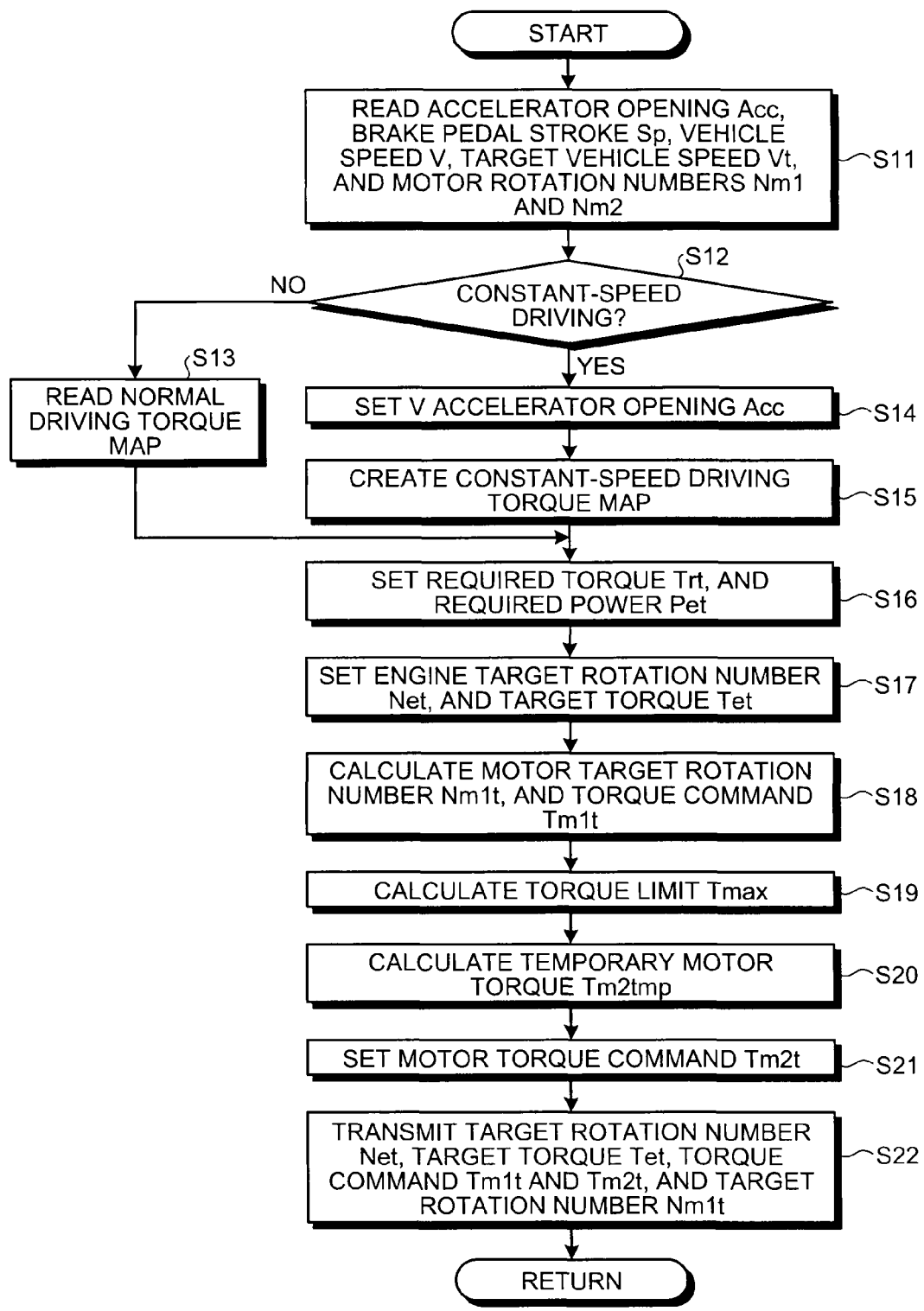
FIG. 3 is a flowchart showing driving force control in the vehicle driving force control apparatus of this embodiment.
Figure 4:
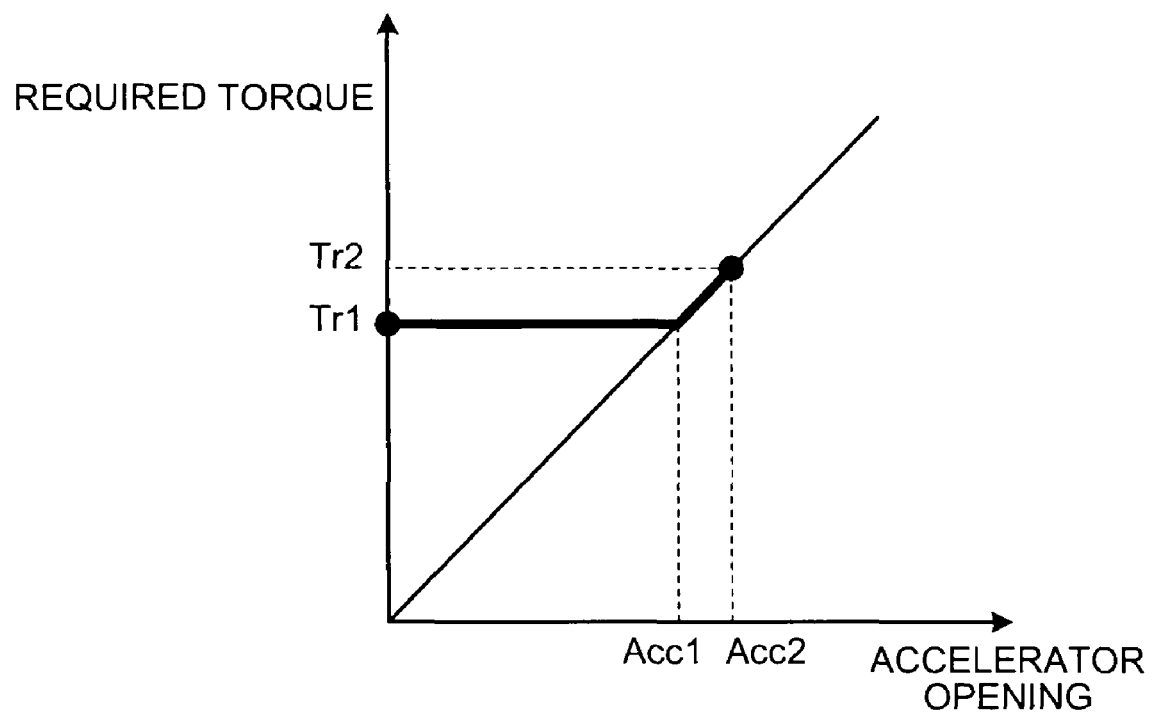
FIG. 4 is a constant-speed driving control map used by a conventional vehicle driving force control apparatus.

FIG. 1 is a schematic configuration diagram showing a vehicle driving force control apparatus according to one embodiment of the present invention, FIG. 2 is a graph showing required torque with respect to a torque command value in the vehicle driving force control apparatus of this embodiment, and FIG. 3 is a flowchart showing driving force control in a vehicle driving force control apparatus of this embodiment.

A vehicle to which the vehicle driving force control apparatus of this embodiment is applied is a hybrid vehicle equipped with an engine, an electric motor, and an electricity generator as a power source, and the engine, the electric motor, and the electricity generator are connected by a power distribution integration mechanism to distribute output of the engine to the electricity generator and driving wheels, transmits output from the electric motor to the driving wheels, and serves as a transmission regarding driving force transmitted from a drive shaft to the driving wheels through a decelerator.

That is to say, as shown in FIG. 1, a hybrid vehicle 11 of this embodiment has an engine 12, a triaxial power distribution integration mechanism 15 connected to a crank shaft 13 as an output shaft of the engine 12 through a damper 14, a motor (MG1) 16 capable of generating electricity connected to the power distribution integration mechanism 15, a reduction gear 18 attached to a ring gear shaft 17 as a drive shaft connected to the power distribution integration mechanism 15, a motor (MG2) 19 connected to the reduction gear 18, and a hybrid electronic control unit 20 for controlling an entire power output apparatus.

The engine 12 is an internal-combustion engine for outputting power by hydrocarbon fuel such as gasoline and light oil, and receives an operation control command such as fuel injection control, ignition control, and intake air mass adjustment control, by an engine electronic control unit (hereinafter, referred to as an engine ECU) 21 for inputting signals from various sensors for detecting an operating condition of the engine 12. The engine ECU 21 can communicate with the hybrid electronic control unit 20 to control the operation of the engine 12 by a control signal from the hybrid electronic control unit 20 and output data relating to the operating condition of the engine 12 to the hybrid electronic control unit 20 as needed.

The power distribution integration mechanism 15 has a sun gear 22, which is an external-tooth gear, a ring gear 23, which is an internal-tooth gear arranged concentrically with the sun gear 22, a plurality of pinion gears 24 meshing with the sun gear 22 and with the ring gear 23, and a carrier 25 for rotatably and revolvably holding the pinion gears 24, and is configured as a planetary gear mechanism for performing a differential action with the sun gear 22, the ring gear 23, and the carrier 25 as rotational elements. In the power distribution integration mechanism 15, the crank shaft 13 of the engine 12 is coupled to the carrier 25, the motor 19 is coupled to the sun gear 22, and the reduction gear 18 is coupled to the ring gear 23 through the ring gear shaft 17, respectively. When the motor 16 serves as the electricity generator, the power from the engine 12 input from the carrier 25 is distributed to the sun gear 22 side and the ring gear 23 side according to a gear ratio thereof, and when the motor 16 serves as the electric motor, the power from the engine 12 input from the carrier 25 and the power from the motor 16 input from the sun gear 22 are integrated and output to the ring gear 23 side. The power output to the ring gear 23 is finally output to driving wheels 28 of the vehicle from the ring gear shaft 17 through a gear mechanism 26 and a differential gear 27.

Each of the motors 16 and 19 is configured as a well-known synchronous generator-motor, which can be driven as the electricity generator and driven as the electric motor to exchange electricity with a battery 31 through inverters 29 and 30. Electricity lines 32 connecting the inverters 29 and 30 and the battery 31 are configured as a positive electrode bus bar and a negative electrode bus bar commonly used by the inverters 29 and 30, and the electricity generated by one of the motors 16 and 19 can be consumed by the other motor. Therefore, the battery 31 is charged and discharged by electricity generated by one of the motors 16 and 19 and by insufficient electricity. Meanwhile, if the electricity from the motors 16 and 19 is balanced, the battery 31 is not charged and discharged.

The drive of the motors 16 and 19 is controlled by a motor electronic control unit (hereinafter, referred to as a motor ECU) 33. Signals required for controlling the drive of the motors 16 and 19, such as signals from rotational position detection sensors 34 and 35 for detecting rotational positions of rotators of the motors 16 and 19 and phase current to be applied to the motors 16 and 19 detected by a current sensor (not shown) are input to the motor ECU 33, and switching control signals to the inverters 29 and 30 are output from the motor ECU 33. The motor ECU 33 communicates with the hybrid electronic control unit 20 to control the drive of the motors 16 and 19 by the control signal from the hybrid electronic control unit 20 and output data relating to the operating condition of the motors 16 and 19 to the hybrid electronic control unit 20 as needed.

The battery 31 is managed by a battery electronic control unit (hereinafter, referred to as a battery ECU) 36. Signals required to manage the battery 31, such as inter-terminal voltage from a voltage sensor (not shown) installed between terminals of the battery 31, charging/discharging current from a current sensor (not shown) attached to the electricity lines 32 connected to an output terminal of the battery 31, and a cell temperature from a temperature sensor (not shown) attached to the battery 31 are input to the battery ECU 36, and data relating to condition of the battery 31 is output to the hybrid electronic control unit 20 by communication as needed. Meanwhile, the battery ECU 36 also calculates a state of charge (SOC) based on an integrated value of the charging/discharging current detected by the current sensor in order to manage the battery 31.

The hybrid electronic control unit 20 is configured as a microprocessor centered on a CPU 41, and has a ROM 42 for storing a processing program, a RAM 43 for temporarily storing data, and an input port, and output port, and a communication port (not shown), in addition to the CPU 41. An ignition signal from an ignition switch 44, a shift position signal SP from a shift position sensor 46 for detecting an operation position of a shift lever 45, accelerator opening Acc from an accelerator pedal position sensor 48 for detecting a depression amount of an accelerator pedal 47, a pedal stroke Sp from a brake pedal stroke sensor 50 for detecting a depression amount of a brake pedal 49, a vehicle speed V from a vehicle speed sensor 51, a set signal and a cancellation signal for constant-speed driving from an auto cruise switch 52 provided in the vicinity of a steering wheel are input to the hybrid electronic control unit 20 through the input port.

When the set signal from the auto cruise switch 52 is input, the hybrid electronic control unit 20 sets the vehicle speed V at that time as a target vehicle speed Vt to set a constant-speed driving mode (auto cruise mode), and cancels the constant-speed driving mode by canceling the set target vehicle speed Vt when the cancel signal from the auto cruise switch 52 is input. In addition, when the accelerator opening Acc from the accelerator pedal position sensor 48 and the pedal stroke Sp from the brake pedal stroke sensor 50 are input during the constant-speed driving mode, the set target vehicle speed Vt is changed. Also, the hybrid electronic control unit 20 is connected to the engine ECU 21, the motor ECU 33, and the battery ECU 36 through the communication port as described above to exchange various control signals and data with the engine ECU 21, the motor ECU 33, and the battery ECU 36.

The hybrid vehicle 11 of the embodiment thus configured calculates the required torque, which should be output to the ring gear shaft 17 as the drive shaft, based on the accelerator opening Acc corresponding to the depression amount of the accelerator pedal 47 by a driver and the vehicle speed V, and the drive of the engine 12, and the motors 16 and 19 is controlled such that required driving force corresponding to the required torque is output to the ring gear shaft 17. As the drive control of the engine 12 and the motors 16 and 19, there are a torque conversion operation mode of controlling the drive of the engine 12 such that the driving force matching the required driving force is output from the engine 12 and of controlling the drive of the motors 16 and 19 such that entire driving force output from the engine 12 is torque-converted by the power distribution integration mechanism 15 and the motors 16 and 19 to be output to the ring gear shaft 17, a charging/discharging operation mode of controlling the drive of the engine 12 such that the driving force matching a sum of the required driving force and power required for charging and discharging the battery 31 is output from the engine 12 and of controlling the drive of the motors 16 and 19 such that an entire or a part of power output from the engine 12 with charging and discharging of the battery 31 is torque-converted by the power distribution integration mechanism 15 and the motors 16 and 19 and the required driving force is output to the ring gear shaft 17, and a motor operation mode of controlling the drive such that the driving force matching the required driving force from the motor 19 is output to the ring gear shaft 17 by stopping the drive of the engine 12.

Then, a vehicle speed sensor 51 is applied to the hybrid vehicle 11 of this embodiment as vehicle speed detecting means for detecting the vehicle speed V. The hybrid electronic control unit 20 sets the target vehicle speed Vt for the constant-speed driving based on set operation of the auto cruise switch (target vehicle speed setting means) 52 by the driver. Then, when the target vehicle speed Vt is set, the hybrid electronic control unit 20 sets required torque Trt (constant-speed driving required torque setting means) such that the vehicle speed V detected by the vehicle speed sensor 51 becomes the targeted vehicle speed Vt. Next, when the required torque Trt is set, the hybrid electronic control unit 20 sets a constant-speed driving torque map (constant-speed driving torque map creating means) indicating the required torque Trt with respect to a torque command value by an accelerator operation or a brake operation by the driver by using the required torque Trt, and a positive maximum torque Tramax and a negative maximum torque Trbmax, which the vehicle can output. The hybrid electronic control unit 20 changes the required torque Trt (required torque changing means) by using the constant-driving torque map according to the torque command value.

Also, in this embodiment, the torque command value is the accelerator opening Acc detected by the accelerator pedal position sensor 48 or the pedal stroke Sp detected by the brake pedal stroke sensor 50. Then, the hybrid electronic control unit (constant-speed driving torque map creating means) 20 sets a constant-speed driving torque map curved line X indicating the required torque Trt with respect to the accelerator opening Acc of the driver by using the required torque Trt and the vehicle maximum positive torque (vehicle maximum driving force) Tramax when the accelerator opening Acc is maximum opening Accmax, as shown in FIG. 2. Also, the hybrid electronic control unit (constant-speed driving torque map) 20 sets a constant-speed driving torque map curved line Y indicating the required torque Trt with respect to the pedal stroke Sp of the driver by using the required torque Trt and the vehicle maximum negative torque (vehicle maximum braking force) Trbmax when the pedal stroke Sp is a maximum stroke Spmax.

In this case, the constant-speed driving torque map set by the hybrid electronic control unit 20 is formed by a curved line X-Y, which smoothly connects the positive maximum torque (vehicle maximum positive torque Tramax), the required torque Trt, and the negative maximum torque (vehicle maximum negative torque Trbmax), and a change amount at an early phase of the change of the required torque Trt by the hybrid electronic control unit (required torque changing means) 20 is set to be smaller than the change amount at a late phase of the change. Meanwhile, when the hybrid vehicle 11 drives a downslope, only the negative required driving force Trt, that is to say, the braking force is generated, and the constant-speed driving torque map curved line X-Y is indicated by a two-dot chain line in FIG. 2. That is to say, the constant-speed driving torque map curved line X-Y is set according to the required torque Trt set by the accelerator opening Acc and the pedal stroke Sp.

Meanwhile, the vehicle maximum torque Tramax with respect to the accelerator maximum opening Accmax and the vehicle maximum torque Trbmax with respect to the brake pedal maximum stroke Spmax are fixed values set by a specification of the hybrid vehicle 11.

When the required torque Trt is changed by the hybrid electronic control unit (required torque changing means) 20, the constant-speed driving torque map is changed by using the changed required torque Trt and the positive maximum torque (maximum opening Accmax), and the required torque Trt and the negative maximum torque (maximum stroke Spmax).

Also, in this embodiment, a normal driving torque map indicating the required torque Trt with respect to the torque command value, that is to say, a normal driving torque map straight line Z is set in advance by using an original point 0, the positive maximum torque (maximum opening Accmax), and the negative maximum torque (maximum stroke Spmax). When the target vehicle speed Vt for the constant-speed driving is not set based on the auto cruise switch (set operation) 52 by the driver, the hybrid electronic control unit (required torque changing means) 20 changes the required torque Trt by using the normal driving torque map.

Herein, the driving force control by the driving force control apparatus of the hybrid vehicle of the above-described embodiment, especially the constant-speed driving control is described in detail with reference to a flowchart in FIG. 3. Meanwhile, a routine of the driving force control executed by the hybrid electronic control unit 20 shown in the flowchart in FIG. 3 is repeatedly executed every predetermined time period. Also, since the operation at the time of the constant-speed driving (at the time of auto cruise) is considered, it is described on the assumption that the hybrid vehicle 11 is operated in the torque conversion operation mode and the charging/discharging operation mode.

In the driving force control by the hybrid vehicle driving force control apparatus of this embodiment, as shown in FIG. 3, at a step S11, the CPU 41 of the hybrid electronic control unit 20 performs processing to read data required for controlling such as the accelerator opening Acc from the accelerator pedal position sensor 48, the brake pedal stroke Sp from the brake pedal stroke sensor 50, the vehicle speed V from the vehicle speed sensor 51, the target vehicle speed Vt, and rotation numbers Nm1 and Nm2 of the motors 16 and 19. Herein, in this embodiment, the target vehicle speed Vt set based on the vehicle speed V detected by the vehicle speed sensor 51 and stored in a predetermined address of the RAM 43 is read when the set signal from the auto cruise switch 52 is input. Also, the rotation numbers Nm1 and Nm2 of the motors 16 and 19 calculated based on the rotational positions of the rotators of the motors 16 and 19 detected by the rotational position detecting sensors 34 and 35 are input from the motor ECU 33 by communication.

At a step S12, whether it is in the constant-speed driving mode is judged based on existence or nonexistence of setting of the target vehicle speed Vt by the auto cruise switch 52 and a setting flag of the constant-speed driving mode. Herein, when it is judged not to be in the constant-speed driving mode, the procedure shifts to a step S13 to read the normal driving torque map straight line Z set in advance. On the other hand, when it is judged to be in the constant-speed driving mode at the step S12, the accelerator opening Acc (or the brake pedal stroke Sp) when the set signal is input from the auto cruise switch 52 is set as the torque command value at a step S14. Then, at a step S15, the above-described constant-speed driving torque map curved line X-Y is set.

Then, at a step S16, the required torque Trt is set based on current accelerator opening Acc detected by the accelerator pedal position sensor 48 (or brake pedal stroke Sp) or set accelerator opening Acc (or brake pedal stroke Sp) and the vehicle speed V, and required power Pet, which should be output from the engine 12, is set. In this embodiment, the required torque Trt is set by defining relationship between the accelerator opening Acc (or the brake pedal stroke Sp), the vehicle speed V, and the required torque Trt in advance to store in the ROM 42 as a required torque setting map, and calculating corresponding required torque Trt from the stored map when the accelerator opening Acc (or the brake pedal stroke Sp) and the vehicle speed V are given. Also, the required power Pet can be calculated by adding a charging/discharging required amount Pbt of the battery 31 and loss to the value obtained by multiplying the set required torque Trt by the rotation number Nr of the ring gear shaft 17. Meanwhile, the rotation number Nr of the ring gear shaft 17 can be obtained by multiplying a conversion factor k by the vehicle speed V or by dividing the rotation number Nm2 of the motor 19 by a gear ratio Gr of the reduction gear 18. The charging/discharging required amount Pbt can be set by the state of charge (SOC) of the battery 31, the accelerator opening Acc (or the brake pedal stroke Sp), and the like.

When the required torque Trt and the required power Pet are set, at a step S17, a target rotation number Net and target torque Tet of the engine 12 are set based on the required power Pet. The target rotation number Ne and the target torque Tet are set based on an operation line and the required power Pet for allowing the engine 12 to efficiently operate when the required torque Trt is set in the required power Pet.

Next, at a step 18, a target rotation number Nm1*t* of the motor 16 is calculated by using the set target rotation number Net, a rotation number Nr (Nm2/Gr) of the ring gear shaft 17, and the gear ratio of the power distribution integration mechanism 15, and a torque command Tm1*t* of the motor 16 is calculated based on the calculated target rotation number Nm1*t* and the current rotation number Nm1. When the target rotation number Nm1*t* and the torque command Tm1*t* of the motor 16 are calculated, at a step S19, a torque limit Tmax as an upper limit of the torque, which may be output from the motor 19, is calculated by dividing deviation between an output limit Wout of the battery 31 and power consumption (generated power) of the motor 16 obtained by multiplying the current rotation number Nm1 of the motor 16 by the calculated torque command Tm1*t* of the motor 16 by the rotation number Nm2 of the motor 19. Also, at a step S20, temporary motor torque Tm2*tmp* as the torque, which should be output from the motor 19, is calculated by using the required torque Trt, the torque command Tm1*t*, and the gear ratio of the power distribution integration mechanism 15. Also, at a step S21, the calculated torque limit Tmax and the temporary motor torque Tm2*tmp* are compared, and a smaller one is set as the torque command Tm2*t* of the motor 19. Then, by setting the torque command Tm2*t* of the motor 19 in this manner, the required torque Trt to be output to the ring gear shaft 17 as the drive shaft may be set as the torque limited in a range of the output limit of the battery 31. After that, at a step S22, the target rotation number Net, the target torque Tet, the torque commands Tm1*t* and Tm2*t*, and the target rotation number Num1*t* are transmitted.

Therefore, when the set signal is not input from the auto cruise switch 52, the normal driving torque map (straight line Z) set in advance is used, and the required torque Trt is changed according to the current accelerator opening Acc detected by the accelerator position sensor 48 or the brake pedal stroke Sp detected by the brake pedal stroke sensor 50. That is to say, when the torque command value is changed by the accelerator pedal 47 and the brake pedal 49, the required torque Trt is changed along the normal driving torque map straight line Z shown in FIG. 2.

On the other hand, when the set signal is input from the auto cruise switch 52, the constant-speed driving torque map curved line Y indicating the required torque Trt with respect to the torque command value (accelerator opening Acc or the brake pedal stroke Sp) is set by using the required torque Trt, the vehicle maximum positive torque Tramax, and the vehicle maximum negative torque Trbmax. Then, during the constant-speed driving, when the accelerator pedal 47 or the brake pedal 49 are depressed by the driver, the required torque Trt is changed according to the accelerator opening Acc or the brake pedal stroke Sp at that time. That is to say, when the torque command value is changed by the accelerator pedal 47 or the brake pedal 49, the constant-speed driving control is not cancelled, and the required torque Trt is changed along the constant-speed driving torque map curved line X-Y shown in FIG. 2.

In this manner, in the vehicle driving force control apparatus according to this embodiment, the hybrid electronic control unit 20 controls to set the target vehicle speed Vt for the constant-speed driving based on the setting operation of the auto cruise switch 52 by the driver, when the target vehicle speed Vt is set, to set the required torque Trt such that the vehicle speed V detected by the vehicle speed sensor 51 becomes the target vehicle speed Vt, and when the required torque Trt is set, to set the constant-speed driving torque map indicating the required torque Vrt with respect to the torque command value by the accelerator operation or the brake operation by the driver by using the required torque Trt, and the positive maximum torque Tramax and the negative maximum torque Trbmax, which the vehicle can output, and to change the required torque Trt by using the constant-speed driving torque map according to the torque command value.

Therefore, during the constant-speed driving of the vehicle, the constant-speed driving torque map is set, so that when the accelerator opening or the brake pedal stroke as the torque command value are changed at the time of the constant-speed driving, the required torque is changed by using the constant-speed driving torque map according to the torque command value, and controllability can be improved due to improvement in followability of the torque change from the constant-speed driving state, and drivability can be improved.

Also, in the vehicle driving force control apparatus according to this embodiment, the constant-speed driving torque map indicating the required driving force with respect to the accelerator opening by the driver is set by using the vehicle maximum driving force when the required torque and the accelerator opening are the maximum. Also, by using the vehicle maximum braking force when the required torque and the brake pedal stroke are the maximum, the constant-speed driving torque map indicating the required braking force with respect to the brake pedal stroke by the driver is set.

Therefore, when there is a request to increase or decrease the speed of the vehicle from the driver during the constant-speed driving of the vehicle, it is possible to increase or decrease the speed in an early stage by the constant-speed driving torque map thereby improving controllability. In addition, in this case, the increase and decrease in speed are controlled by one constant-speed driving torque map curved line, so that integrated management of the control torque becomes possible, thereby simplifying the control program.

Also, in the vehicle driving force control apparatus according to this embodiment, the constant-speed driving torque map is formed by a curved line smoothly connecting the positive maximum torque, the required torque, and the negative maximum torque, and when the required torque is changed according to the change of the torque command value, the change amount at the early stage of the change of the required torque is set to be smaller than the change amount at the late stage of change. Therefore, when increasing or decreasing the speed from the constant-speed driving of the vehicle, the change amount at the early stage of change is small, so that acceleration shock and deceleration shock to the driver are prevented and the drivability can be improved.

Also, in the vehicle driving force control apparatus according to this embodiment, when the required torque is changed, the constant-speed driving torque map is changed by using the changed required torque, the positive maximum torque, and the negative maximum torque. Therefore, the constant-speed driving torque map is occasionally changed according to the change of the required torque, so that the followability of the torque change from the constant-speed driving state can be improved.

In addition, the vehicle driving force control apparatus according to this embodiment sets the normal driving torque map indicating the required torque with respect to the torque command value by using the original point, the positive maximum torque, and the negative maximum torque in advance, and when the target vehicle speed is not set, the required torque is changed by using the normal driving torque map. Therefore, the required torque is appropriately set by the normal driving torque map even during the normal driving, and the controllability can be improved.

Industrial Applicability

In this manner, the vehicle driving force control apparatus according to the present invention is to improve the controllability by improving the followability of the torque change when changing the vehicle speed from the constant-speed driving and to improve the drivability, and is useful in application to the hybrid vehicle capable of driving with the engine and the electric motor as the power source.

The invention claimed is:

1. A vehicle driving force controlling apparatus, comprising:
   a vehicle speed detecting unit that detects a vehicle speed;
   a target vehicle speed setting unit that sets a target vehicle speed for constant-speed driving based on setting operation by a driver;
   a constant-speed driving required torque setting unit that sets required torque such that the vehicle speed detected by the vehicle speed detecting unit becomes the target vehicle speed when the target vehicle speed is set by the target vehicle speed setting unit;
   a constant-speed driving torque map creating unit that sets a constant-speed driving torque map indicating required torque with respect to a torque command value by accelerator operation or brake operation by the driver, passing through the required torque, and a positive maximum torque and a negative maximum torque, which the vehicle can output, when the required torque is set by the constant-speed driving required torque setting unit; and
   a required torque changing unit that changes the required torque by using the constant-speed driving torque map according to the torque command value,
   wherein a normal driving torque map, indicating the required torque with respect to the torque command value and passing through an original point, the positive maximum torque, and the negative maximum torque, are set in advance, and when the target vehicle speed is not set by the target vehicle speed setting unit, the required torque changing unit changes the required torque by using the normal driving torque map,
   wherein, when the required torque set by the constant-speed driving required torque setting unit is a positive value, the constant-speed driving torque map makes values of the required torque which correspond with respective values of the torque command value greater than required torque values corresponding to the normal driving torque map, and
   wherein, when the required torque set by the constant-speed driving required torque setting unit is a negative value, the constant-speed driving torque map makes values of the required torque which correspond with respective values of the torque command value lesser than required torque values corresponding to the normal driving torque map.

2. The vehicle driving force controlling apparatus according to claim 1, wherein the constant-speed driving torque map creating unit sets the constant-speed driving torque map indicating required driving force with respect to an accelerator operation amount by the driver by using the required torque and vehicle maximum driving force when the accelerator operation amount is the maximum.

3. The vehicle driving force control apparatus according to claim 1, wherein the constant-speed driving torque map creating unit sets the constant-speed driving torque map indicating required braking force with respect to a brake operation amount by the driver by using the required torque and vehicle maximum braking force when the brake operation amount is the maximum.

4. The vehicle driving force control apparatus according to claim 1, wherein the constant-speed driving torque map is formed by a curved line smoothly connecting the positive maximum torque, the required torque, and the negative maximum torque, and a change amount at an early phase of change of the required torque by the required torque changing unit is set so as to be less than a change amount at a late phase of the change.

5. The vehicle driving force control apparatus according to claim 1, wherein when the required torque is changed by the required torque changing unit, the constant-speed driving torque map creating unit changes the constant-speed driving torque map by using the changed required torque, the positive maximum torque, and the negative maximum torque.

6. The vehicle driving force controlling apparatus according to claim 1, further comprising:
   a combustion engine that outputs torque by burning fuel; and
   an electric motor that outputs torque by supply of electricity,
   wherein the required torque includes the torque produced by the engine and the torque produced by the electric motor.

* * * * *